(12) United States Patent
Itabashi

(10) Patent No.: US 6,429,956 B2
(45) Date of Patent: Aug. 6, 2002

(54) OPTICAL SCANNING DEVICE AND IMAGE FORMING APPARATUS HAVING THE SAME

(75) Inventor: Akihisa Itabashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 7 days.

(21) Appl. No.: 09/764,262

(22) Filed: Jan. 19, 2001

(30) Foreign Application Priority Data

Jan. 21, 2000 (JP) ...................................... 2000-013351

(51) Int. Cl.$^7$ ................................................ G02B 26/08
(52) U.S. Cl. ........................ 359/204; 359/216; 347/243
(58) Field of Search ........................ 359/204, 216–219, 359/900; 347/232–236, 243, 244, 238, 239; 399/118, 220; 358/474, 296

(56) References Cited

U.S. PATENT DOCUMENTS 4,788,560 A * 11/1988 Miura ........................ 347/236

FOREIGN PATENT DOCUMENTS

| JP | 7-012709 | * | 2/1995 |
| JP | 7-199096 | * | 8/1995 |
| JP | 7-235715 | * | 9/1995 |

* cited by examiner

Primary Examiner—James Phan
(74) Attorney, Agent, or Firm—Oblon, Spivak, McClelland, Maier & Neustadt, P.C.

(57) ABSTRACT

In an optical scanning device of the present invention, a plurality of light sources emit a plurality of light beams. An optical system has a rotary polygonal mirror deflecting the light beams from the light sources, the optical system focusing the deflected light beams onto a scanned surface to form light spots thereon, the scanned surface being optically scanned with the light spots by a rotation of the rotary polygonal mirror. A light-amount monitoring unit monitors respective amounts of the light beams emitted by the light sources. A control unit controls the respective amounts of the light beams emitted by the light sources, based on detection signals output from the light-amount monitoring unit. The optical scanning device is configured to satisfy the formula: $A<T-m\cdot t$ where A is an imaging period from a start of the optical scanning of imaging information to an end of the optical scanning, m is the number of the light sources, t is a time needed to complete the control of the light amount of one of the light sources after monitoring of the amount of the light beam emitted by that light source, T is a scanning period indicated by the equation $T=60/(R\cdot n)$, R is the number of revolutions per minute of the rotary polygonal mirror, and n is the number of reflection surfaces of the rotary polygonal mirror.

13 Claims, 5 Drawing Sheets

OPTICAL SCANNING DEVICE AND IMAGE FORMING APPARATUS HAVING THE SAME

BACKGROUND OF THE INVENTION

1. Field of the Invention

The present invention generally relates to an optical scanning device for use in an image forming apparatus using an electrophotographic printing process to form an image, and, more particularly, to an optical scanning device in which the multiple light beams, emitted by a plurality of light sources, are deflected by a rotary polygonal mirror and the deflected beams are focused onto a scanned surface of a photosensitive medium so that the photosensitive medium surface is scanned with the light spots. Further, the present invention relates to an image forming apparatus in which the optical scanning device is provided.

2. Description of the Related Art

With the widespread use of image forming systems, such as laser printers and digital copiers, there is an increasing demand for improved print-out speeds of the image forming systems. To meet the requirement, an optical multi-beam scanning device has been proposed for use in the image forming systems. In the multi-beam scanning device, the rotating speed of a rotary polygonal mirror is increased and a plurality of light sources, such as laser diodes, are used to emit multiple light beams for scanning the scanned surface with the multiple light spots at a time.

In the multi-beam scanning device of the above type, the amount of the laser beam emitted by each of the plurality of laser diodes is significantly affected by the magnitude of an electric current flowing through the laser diode, the ambient temperature, and a change in temperature of the laser diode itself. The multi-beam scanning device typically employs a light monitoring sensor to monitor the amount of the laser beam emitted by each of the plurality of laser diodes, and the amount of the laser beam is controlled based on the result of the monitoring by using a feedback circuit.

As disclosed in Japanese Published Application No.7-12709 (corresponding to Japanese Laid-Open Patent Application No.63-163872), an optical scanning device using a semiconductor laser array as the plurality of light sources is known. The amounts of laser beams emitted by the laser diodes of the array are individually detected by a time-division method using a small number of light monitoring sensors. The number of light monitoring sensors is smaller than the number of the light sources. The detection signals indicating the monitored light amounts are produced by the sensors and compared with reference values that are predetermined for the respective light sources. The amounts of the laser beams are controlled based on the results of the monitoring such that the amounts of the laser beams emitted by the laser diodes are set at controlled light amounts.

Similarly, Japanese Laid-Open Patent Application No.7-235715 discloses an optical scanning device using a semiconductor laser array as the plurality of light sources. In the optical scanning device of the above document, one of the light sources is selected and sequentially turned on so that only the on-state light source emits the laser beam. Using a single light monitoring sensor, the amount of the laser beam from the selected light source is monitored. The respective amounts of the laser beams from the plurality of light sources are individually controlled based on the result of the monitoring with respect to the selected light source that is sequentially supplied by the sensor.

Further, as disclosed in Japanese Laid-Open Patent Application No.7-199096, a similar optical scanning device that uses a semiconductor laser chip including two laser diodes is known. The amounts of laser beams emitted by the two laser diodes are individually detected by using a single light monitoring sensor. When one of the two light sources is turned on to emit a laser beam for monitoring, the other light source is set in the off state and does not emit a laser beam. The amounts of the laser beams are controlled based on the result of the monitoring produced by the sensor, such that the amounts of the laser beams emitted by the two light sources are set at a controlled light amount.

In the conventional optical scanning devices of the above documents, the amounts of the laser beams are separately controlled based on the results of the monitoring such that the amounts of the laser beams emitted by the light sources are set at the controlled light amount.

However, the light amount control must be performed during a non-imaging period in which the image formation is not performed. The above documents do not take account of the problem that it takes a relatively long time to monitor and control the light amount of each of the plurality of light sources. The larger the number of the light sources included in the optical scanning device, the longer the time needed for monitoring the amounts of the emitted laser beams and controlling the light amounts of the light sources.

In the conventional optical scanning devices of the above documents, there is a problem in that the timing of light-amount control of the light sources may interfere with the timing of sync signal detection to start the optical scanning of imaging information of the light sources. In such a case, it is difficult to attain the formation of an image with good quality.

SUMMARY OF THE INVENTION

In order to overcome the above-described problems, it is an object of the present invention to provide an improved optical scanning device that carries out the light-amount control for a plurality of light sources and safely prevents, with a simple, inexpensive configuration, the undesired interference between the timing of light-amount control of the light sources and the timing of sync signal detection to start the optical scanning of imaging information of the light sources.

Another object of the present invention is to provide an image forming apparatus in which an optical scanning device is provided, the optical scanning device safely preventing, with a simple, inexpensive configuration, the undesired interference between the timing of light-amount control of the light sources and the timing of sync signal detection to start the optical scanning of imaging information of the light sources.

Another object of the present invention is to provide an optical scanning method that carries out the light-amount control for a plurality of light sources and safely prevents, with a simple, inexpensive configuration, the undesired interference between the timing of light-amount control of the light sources and the timing of sync signal detection to start the optical scanning of imaging information of the light sources.

The above-mentioned objects of the present invention are achieved by an optical scanning device which comprises: a plurality of light sources emitting a plurality of light beams; an optical system having a rotary polygonal mirror deflecting the light beams from the light sources, the optical system focusing the deflected light beams onto a scanned surface to form light spots thereon, the scanned surface being optically scanned with the light spots by a rotation of the rotary polygonal mirror; a light-amount monitoring unit monitoring respective amounts of the light beams emitted by the light sources; and a control unit controlling the respective amounts of the light beams emitted by the light sources, based on detection signals output from the light-amount monitoring unit, wherein the optical scanning device is configured to satisfy the formula: $A<T-m \cdot t$ where A is an imaging period from a start of the optical scanning of imaging information to an end of the optical scanning, m is the number of the light sources, t is a time needed to complete the control of the light amount of one of the light sources after monitoring of the amount of the light beam emitted by that light source, T is a scanning period indicated by the equation $T=60/(R \cdot n)$, R is the number of revolutions per minute of the rotary polygonal mirror, and n is the number of reflection surfaces of the rotary polygonal mirror.

The above-mentioned objects of the present invention are achieved by an image forming apparatus in which an optical scanning device is provided, the optical scanning device comprising: a plurality of light sources emitting a plurality of light beams; an optical system having a rotary polygonal mirror deflecting the light beams from the light sources, the optical system focusing the deflected light beams onto a scanned surface to form light spots thereon, the scanned surface being optically scanned with the light spots by a rotation of the rotary polygonal mirror; a light-amount monitoring unit monitoring respective amounts of the light beams emitted by the light sources; and a control unit controlling the respective amounts of the light beams emitted by the light sources, based on detection signals output from the light-amount monitoring unit, wherein the optical scanning device is configured to satisfy the formula: $A<T-m \cdot t$ where A is an imaging period from a start of the optical scanning of imaging information to an end of the optical scanning, m is the number of the light sources, t is a time needed to complete the control of the light amount of one of the light sources after monitoring of the amount of the light beam emitted by that light source, T is a scanning period indicated by the equation $T=60/(R \cdot n)$, R is the number of revolutions per minute of the rotary polygonal mirror, and n is the number of reflection surfaces of the rotary polygonal mirror.

The above-mentioned objects of the present invention are achieved by an optical scanning method which comprises the steps of: providing a plurality of light sources emitting a plurality of light beams; providing an optical system having a rotary polygonal mirror deflecting the light beams from the light sources, the optical system focusing the deflected light beams onto a scanned surface to form light spots thereon, the scanned surface being optically scanned with the light spots by a rotation of the rotary polygonal mirror; monitoring respective amounts of the light beams emitted by the light sources; and controlling the respective amounts of the light beams emitted by the light sources, based on results of the light-amount monitoring, wherein the optical scanning method is configured to satisfy the formula: $A<T-m \cdot t$ where A is an imaging period from a start of the optical scanning of imaging information to an end of the optical scanning, m is the number of the light sources, t is a time needed to complete the control of the light amount of one of the light sources after monitoring of the amount of the light beam emitted by that light source, T is a scanning period indicated by the equation $T=60/(R \cdot n)$, R is the number of revolutions per minute of the rotary polygonal mirror, and n is the number of reflection surfaces of the rotary polygonal mirror.

In the optical scanning device and the image forming apparatus of the present invention, the elements of the optical scanning device are configured to satisfy the predetermined formula that is derived from a proper relationship between the non-imaging period and the timing of the light-amount control of each of the plurality of light sources. It is possible that the optical scanning device and the image forming apparatus of the present invention safely prevent, with a simple, inexpensive configuration, the interference between the timing of the light-amount control of the light sources and the timing of the sync signal detection to start the optical scanning of the imaging information of the light sources.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will be given of preferred embodiments of the optical scanning device and the image forming apparatus of the present invention with reference to the accompanying drawings.

Figure 1A:
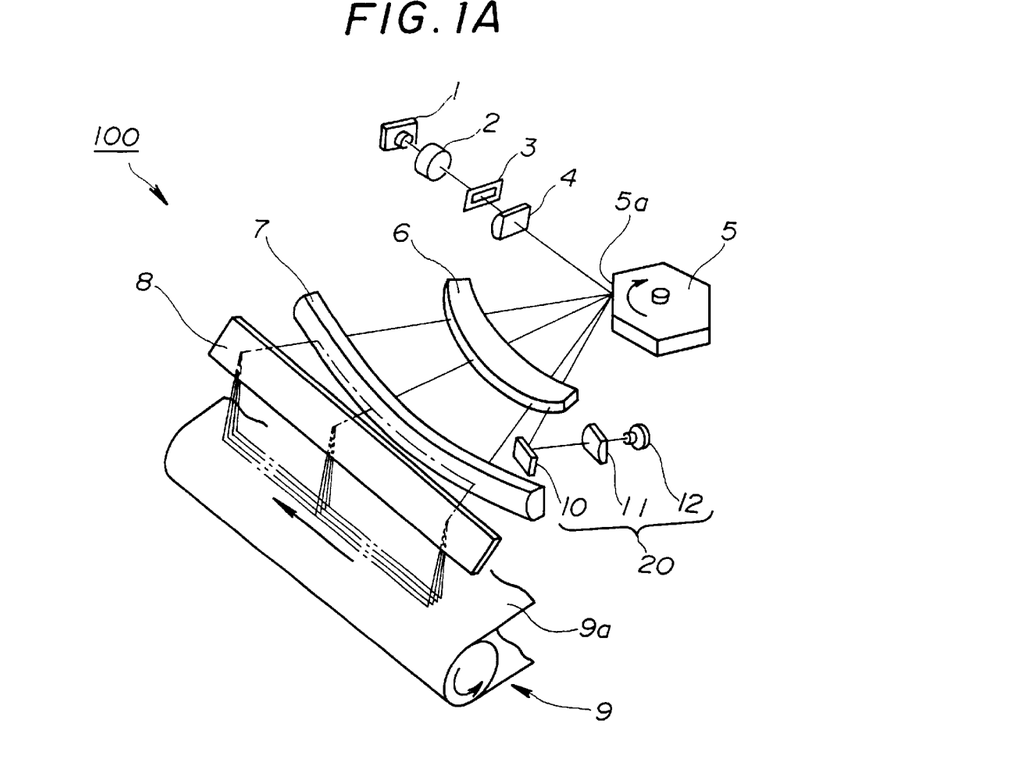
FIG. 1A is a perspective view of one preferred embodiment of the optical scanning device of the present invention.

FIG. 1A shows a configuration of one preferred embodiment of the optical scanning device of the present invention. The optical scanning device of the present embodiment is provided for use in an image forming apparatus, such as a laser printer, a digital copier or a laser facsimile. In the image forming apparatus, an image is formed on a scanned surface of a photosensitive medium when the photosensitive medium surface is scanned in the main scanning direction and the sub-scanning direction by the light beam focused by the optical scanning device.

The optical scanning device of the above-described embodiment is provided for use in an image forming apparatus in which an image is formed through an electrophotographic printing process. In the electrophotographic printing process, there are basically six major steps employed: (1) charging of the photosensitive medium; (2) exposing of the photosensitive medium to the image light pattern; (3) developing of the photosensitive medium with toner; (4) transferring of the toned image from the photosensitive medium to the final medium (usually paper); (5) thermal fusing of the toner to the paper; and (6) cleaning of residual toner from the photosensitive medium surface. The scanning of the photosensitive medium surface, which is performed by the light beams from the optical scanning device of the above-described embodiment, corresponds to the exposing step of the electrophotographic printing process that is carried out by the image forming apparatus.

As shown in FIG. 1A, the optical scanning device 100 of the present embodiment generally comprises a light source unit 1, a coupling lens 2, an aperture stop 3, a line focusing lens 4, a rotary polygonal mirror 5, an f θ lens 6, an elongated focusing lens 7, a reflector mirror 8, a photosensitive belt 9, and a sync monitoring detector 20. The sync monitoring device 20 includes a mirror 10, a focusing lens 11 and a sync monitoring sensor 12.

In the optical scanning device of FIG. 1A, the light source unit 1 includes a plurality of light sources that emit a plurality of divergent light beams in accordance with an image signal. The light beams from the light source unit 1 are passed through the coupling lens 2. The coupling lens 2 couples the light beams emitted by the light source unit 1, and sends the coupled light beams to the aperture stop 3. The aperture stop 3 restricts the diameter of the incident light beams to an appropriate level, and introduces the light beams into the focusing lens 4.

The focusing lens 4 provides a refraction power to the light beams from the coupling lens 2, with respect to only the sub-scanning direction. The rotary polygonal mirror 5 in the present embodiment is a rotary deflector having reflection surfaces on the six peripheral sides. One (indicated by reference numeral 5a in FIG. 1A) of the reflection surfaces of the rotary polygonal mirror 5 deflects the light beams from the focusing lens 4 while the rotary polygonal mirror 5 is rotated at a constant angular velocity around its rotation axis in a rotating direction (indicated by the arrow in FIG. 1A).

The deflected light beams from the mirror 5 are passed through the f θ lens 6 and the elongated focusing lens 7, and the light beams from the focusing lens 7 are reflected to the photosensitive belt 9 by the reflector mirror 8. With the rotation of the rotary deflector 5, the light beams from the reflector mirror 8 scan a scanned surface 9a of the photosensitive belt 9 in the main scanning direction (which is parallel to the axial direction of the photosensitive belt 9).

In a synchronous manner with a time the main scanning is performed (or every time the light beams from the rotary deflector 5 are incident to the sync monitoring device 20), the photosensitive belt 9 is rotated around its rotational axis by a given rotational angle. Hence, the photosensitive medium surface 9a is scanned in the main scanning direction and in the sub-scanning direction by the light beams focused by the optical scanning device 100. The respective light sources of the light source unit 1 are turned on and off in accordance with the image signal, and an electrostatic latent image is formed on the photosensitive medium surface 9a as a result of the exposure of the photosensitive belt 9 to an imaging light pattern provided by the light source unit 1. Hereinafter, the exposure of the photosensitive belt 9 to the imaging light pattern is referred to as the optical scanning of the imaging information by the light source unit 1.

In the optical scanning device 100 of FIG. 1A, the light source unit 1 includes the plurality of light sources that are independently turned on and off in accordance with the image signal. The light beams emitted by the light sources of the light source unit 1 are focused on the photosensitive medium surface 9a so that the respective light spots are formed thereon. The photosensitive medium surface 9a is scanned at a substantially constant speed in the main scanning direction by the light beams, focused by the optical scanning device 100, with the rotation of the rotary deflector 5.

The coupling lens 2 may convert the light beams emitted by the light source unit 1 into substantially parallel light beams. Alternatively, the coupling lens 2 may convert the light beams emitted by the light source unit 1 into divergent light beams or convergent light beams.

In the optical scanning device 100 of FIG. 1A, the sync monitoring device 20 is provided to synchronize the timing of start of every main scanning on the photosensitive medium surface 9a. As described above, every time the light beams from the rotary deflector 5 are incident to the sync monitoring device 20, the sync monitoring device 20 generates a sync signal, and this sync signal is used to start each main scanning of the optical scanning device 100.

The sync monitoring device 20 in the present embodiment includes the mirror 10, the focusing lens 11 and the sync monitoring sensor 12. The mirror 10 reflects the light beams, which are sent by the rotary deflector 5 through the f θ lens 6, to the focusing lens 11. The focusing lens 11 converts the light beams into convergent light beams and introduces them into the sync monitoring sensor 12. The sync monitoring sensor 12 is constituted by a photodiode or a charge-coupled device, and the sync monitoring sensor 12 outputs a sync signal upon the entry of the light beams from the rotary deflector 5. The photosensitive belt 9 is rotated around the rotation axis by the given rotational angle in synchronism with the sync signal output by the sync monitoring device 20.

Figure 1B:
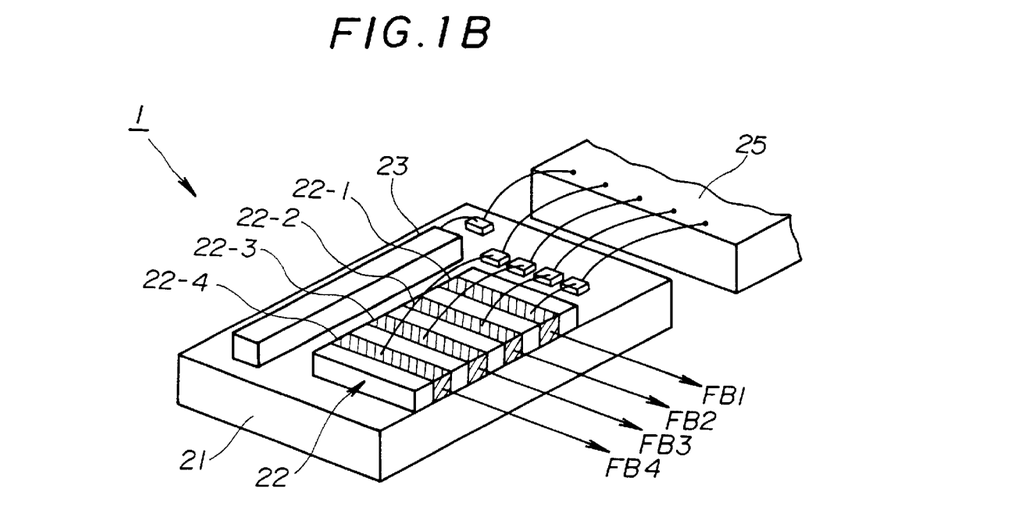
FIG. 1B is a perspective view of a light source unit in the optical scanning device of the present embodiment.
Figure 2A:
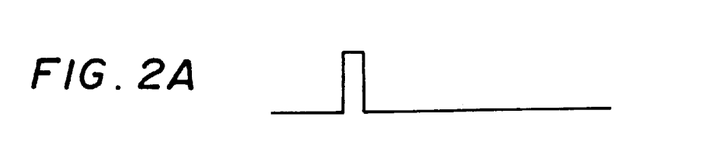
FIG. 2A, FIG. 2B, FIG. 2C and FIG. 2D are time charts for explaining respective times of laser diodes of a semiconductor laser array to start the laser beam emission.
Figure 2B:
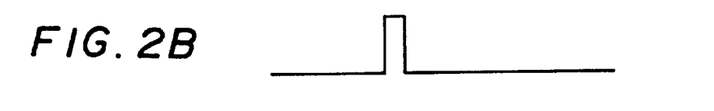
Figure 2C:
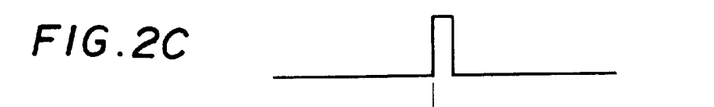
Figure 2D:
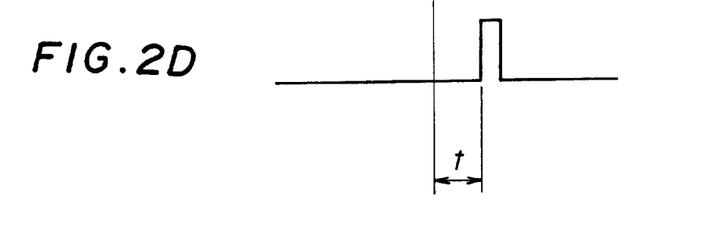

FIG. 1B shows a configuration of the light source unit 1 in the optical scanning device of the present embodiment.

As shown in FIG. 1B, the light source unit 1 generally comprises a substrate 21, a semiconductor laser array 22 and a photodiode 23, and the semiconductor laser array 22 and the photodiode 23 are fabricated on the substrate 21.

The semiconductor laser array 22 includes a plurality of laser diodes 22-1 through 22-4 (in this embodiment, the number of the light sources is equal to 4) arranged in parallel, and one of the laser diodes 22-1 through 22-4 is selectively and independently turned on and off in accordance with an image signal (which carries imaging information). The photodiode 23 is a light-amount monitoring unit that monitors the respective amounts of the laser beams emitted by the laser diodes 22-1 through 22-4.

The laser diodes 22-1 through 22-4 respectively emit divergent laser beams FB1 through FB4 in the forward direction, as shown in FIG. 1B. The semiconductor laser array 22 is configured such that the laser diodes 22-1 through 22-4 respectively emit the divergent laser beams in the backward direction simultaneously with the emission of the forward-direction laser beams FB1 through FB4.

A selected one of the backward-direction laser beams from the laser diodes 22-1 through 22-4 is incident to the photodiode 23, and the photodiode 23 outputs a detection signal indicating a corresponding one of the amounts of the laser beams supplied from the laser diodes 22-1 through 22-4. The detection signal is sent from the photodiode 23 to a feedback circuit 25. The feedback circuit 25 controls the laser drive currents, which are supplied to the laser diodes 22-1 through 22-4, in accordance with the respective detection signals supplied by the photodiode 23, so that the amounts of the laser beams emitted by the laser diodes 22-1 through 22-4 are maintained at a controlled level. According to the control of the feedback circuit 25, it is possible to attain the formation of an image on the photosensitive medium surface 9a.

As previously described, the amounts of the laser beams emitted by the laser diodes are significantly affected by the magnitude of the electric current flowing through each laser diode, the ambient temperature, and the temperature change of the laser diodes. To attain accurate control of the light amounts of the laser diodes by the feedback circuit 25, it is desirable to provide a plurality of light monitoring sensors in the optical scanning device to monitor the respective amounts of the laser beams emitted by the laser diodes. However, the use of such multiple light monitoring sensors will make the optical scanning device complicated and expensive.

In the present embodiment, a single light monitoring sensor (the photodiode 23) is provided in the optical scanning device 100. When the control of the light amounts of the laser diodes is performed by using a single light monitoring sensor, one of the laser diodes 22-1 through 22-4 in the light source unit 1 is selected and sequentially turned on so that only the laser beam, emitted by the selected laser diode, is incident to the light monitoring sensor. At this instant, the remaining laser diodes of the light source unit 1, other than the selected laser diode, are set at one of an off-state level and a non-imaging level lower than the imaging level.

FIG. 2A, FIG. 2B, FIG. 2C and FIG. 2D are time charts for explaining respective times of the laser diodes 22-1 through 22-4 of the light source unit 1 to start the laser beam emission.

In the present embodiment, the number of the light sources in the light source unit 1 is equal to 4, and FIG. 2A through FIG. 2D show the respective times of the laser diodes 22-1 through 22-4 to start the laser beam emission. As shown, one of the laser diodes 22-1 through 22-4 in the light source unit 1 is selected and sequentially turned on so that only the selected laser diode emits the laser beam, and the laser beam from the selected laser diode is incident to the photodiode 23. The feedback circuit 25 controls the laser drive currents, which are supplied to the laser diodes 22-1 through 22-4, in accordance with the respective detection signals supplied by the photodiode 23, so that the amounts of the laser beams emitted by the laser diodes 22-1 through 22-4 are maintained at a controlled level.

In the present embodiment, during a single main scanning of the optical scanning device 100, the amounts of the laser beams emitted by the laser diodes 22-1 through 22-4 are individually monitored by using the photodiode 23, and the control of the light amounts of all of the light sources 22-1 through 22-4 of the light source unit 1 is completed. Hence, in the time charts of FIG. 2A through FIG. 2D, "t" indicates a time needed to complete the control of the light amount of one of the laser diodes 22-1 through 22-4 of the light source unit 1 after monitoring of the amount of the laser beam emitted by the selected laser diode.

Alternatively, during a plurality of main scannings of the optical scanning device 100, the amounts of the laser beams emitted by the laser diodes 22-1 through 22-4 may be individually monitored by using the photodiode 23, and the control of the light amounts of all of the light sources 22-1 through 22-4 of the light source unit 1 may be completed. However, in such alternative embodiment, if the number of the laser diodes is increased, the intervals of the light-amount control become large, and the response of the optical scanning device to a sporadic failure will be significantly deteriorated.

Therefore, it is desirable that the optical scanning device 100 is configured such that, during a single main scanning, the amounts of the laser beams emitted by the laser diodes 22-1 through 22-4 are individually monitored by using the photodiode 23, and the control of the light amounts of all of the light sources 22-1 through 22-4 of the light source unit 1 is completed.

Incidentally, in the present embodiment, the feedback circuit 25 is configured such that a bias current, which is slightly smaller than a threshold value, is supplied to each of the laser diodes 22-1 through 22-4, and, at a time one of the laser diodes 22-1 through 22-4 is selectively turned on, a laser drive current, which is above the threshold value, is supplied to the selected laser diode. According to the above-described control of the feedback circuit 25, the rise-time gradient of the electric current flowing through each of the laser diodes 22-1 through 22-4 can be made steep and stabilized, and it is possible to attain the formation of an image on the photosensitive medium surface 9a with better quality.

However, the time required for the single-scan multiple-light-source case in which the light amounts of the laser diodes 22-1 through 22-4 are individually monitored and the control of the light amounts of all of the light sources 22-1 through 22-4 of the light source unit 1 is completed during a single main scanning, is larger than a time required for the single-scan single-light-source case. If the number of the light sources is increased, the required time will be increased.

Figure 3:
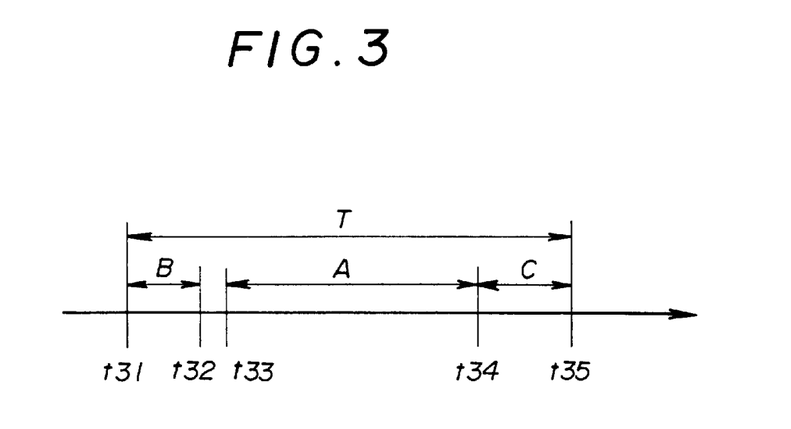
FIG. 3 is a time chart for explaining a scanning period from a start of main scanning of one of reflection surfaces of a rotary polygonal mirror to an end of the main scanning.

FIG. 3 is a time chart for explaining a scanning period from a start of the main scanning of one of the reflection surfaces of the rotary polygonal mirror 5 to an end of the main scanning.

In the time chart of FIG. 3, "t31" indicates a time the main scanning is started by one of the reflection surfaces of the rotary polygonal mirror 5, "t32" indicates a time the sync monitoring sensor 12 outputs a sync signal, "t33" indicates a time the optical scanning of the imaging information is started by the light source unit 1, "t34" indicates a time the optical scanning of the imaging information is terminated by the light source unit 1, and "t35" indicates a time the main scanning is terminated by one of the reflection surfaces of the rotary polygonal mirror 5.

Further, in the time chart of FIG. 3, "T" indicates a period of time needed for one of the reflection surfaces of the rotary polygonal mirror 5 to complete the main scanning on the photosensitive medium surface 9a (hereinafter, this period is called the scanning period "T"). "A" indicates an imaging period needed for the light source unit 1 to complete the optical scanning of the imaging information to the photosensitive medium surface 9a. "B" indicates an initial non-imaging period before the optical scanning of the imaging information is started by the light source unit 1. "C" indicates a final non-imaging period after the optical scanning of the imaging information is terminated by the light source unit 1.

As in the time chart of FIG. 3, the scanning period "T" is equal to a period of time from the start ("t31") of the main scanning of one of the reflection surfaces of the rotary polygonal mirror 5 to the end ("t35") of the main scanning. The scanning period "T" is calculated by dividing a period of one revolution of the rotary polygonal mirror 5 by the number of the reflection surfaces of the rotary polygonal mirror 5. This calculation of the scanning period "T" is represented by the formula:

$$T=(60/R)/n$$

where "R" is the number of revolutions per minute of the rotary polygonal mirror 5, and "n" is the number of the reflection surfaces of the rotary polygonal mirror 5.

As in the time chart of FIG. 3, it is required that, during the entire scanning period "T", the feedback circuit 25 of the optical scanning device 100 carries out the sync signal detection, the image formation, and the light-amount control of each of the laser diodes of the light source unit 1.

During the imaging period "A", indicated by the period between the time "t33" and the time "t34", the optical scanning device 100 carries out the image formation (or the optical scanning of the imaging information) with respect to the main scanning. At the time "t32", which immediately precedes the start of the imaging period "A", the sync monitoring sensor 12 outputs a sync signal in response to the laser beam that is sent to the sensor 12 by the rotary polygonal mirror 5. The feedback circuit 25 detects the sync signal supplied by the sensor 12 in order to determine a time of the start of the optical scanning of the imaging information by the light source unit 1.

In a case wherein the optical system of the optical scanning device 100 is considerably affected due to environmental fluctuations, it is necessary to adjust the width of the main scanning on the photosensitive medium surface 9a. To overcome the problem, a secondary sync monitoring device may be provided in the optical scanning device 100, and the feedback circuit 25 detects a sync signal output by the secondary sync monitoring device during the final non-image period "C" between the time "t34" and the time "t35". Based on the result of the monitoring of the sync monitoring device 20 and on the result of the monitoring of the secondary sync monitoring device, the feedback circuit 25 detects an increase or a decrease of the optical scanning period, and performs a suitable correction to the width of the main scanning on the photosensitive medium surface 9a. This is not indicated in the time chart of FIG. 3.

As in the time chart of FIG. 3, it is required that, during the non-imaging period "B+C", the feedback circuit 25 of the optical scanning device 100 carries out the light-amount control of each of the laser diodes of the light source unit 1. If this requirement is not met, the light-amount control of each of the laser diodes of the light source unit 1 will be performed during the sync signal detection or after the image formation is started. Namely, the timing of the light-amount control of the light sources interferes with the timing of the sync signal detection to start the optical scanning of imaging information of the light sources. Such operations of the optical scanning device 100 will deteriorate the quality of the reproduced image and should be avoided.

In the optical scanning device 100 of the present embodiment, during a combined non-imaging period including the period "C" of the current main scanning and the period "B" of the following main scanning, the feedback circuit 25 of the optical scanning device 100 carries out the light-amount control of each of the laser diodes of the light source unit 1.

In order to achieve the light-amount control of each of the laser diodes of the light source unit 1 during the non-imaging period "B+C", it is necessary that the optical scanning device 100 of the present embodiment is configured to satisfy the following requirements:

$$A = T - K \tag{1}$$

$$K > B + C > m \cdot t \tag{2}$$

where "K" is a non-imaging period (in seconds), namely, the remainder of the scanning period "T" in which the imaging period "A" is excluded, "A" is the imaging period (in seconds) between a start of the optical scanning of the imaging information and an end of the optical scanning of the imaging information, "m" is the number of the laser diodes of the light source unit 1, and "t" indicates a time needed to complete the control of the light amount of one of the laser diodes of the light source unit 1 after monitoring of the amount of the laser beam emitted by that laser diode.

It is readily understood that the above formulas (1) and (2) derives the following formula:

$$A < T - m \cdot t \tag{3}$$

Accordingly, when the optical scanning device 100 is configured such that the above formula (3) is met, it is possible for the optical scanning device 100 to safely prevent, with a simple, inexpensive configuration, the interference between the timing of the light-amount control of the laser diodes and the timing of the sync signal detection to start the optical scanning of the imaging information of the laser diodes.

The above formula (3) may be modified as follows.

$$A/T < 1 - (m \cdot t)/T$$

$$A/T < 1 - R \cdot n \cdot m \cdot t / 60$$

Therefore, the following formula is met.

$$R \cdot n \cdot m \cdot t < (1 - A/T) \cdot 60 \tag{4}$$

Alternatively, the following formula is met.

$$R \cdot m \cdot t < (1 - A/T) \cdot 60 / n \tag{5}$$

Accordingly, when the optical scanning device 100 is configured such that either the above formula (4) or the above formula (5) is met, it is possible for the optical scanning device 100 to safely prevent, with a simple, inexpensive configuration, the interference between the timing of the light-amount control of the laser diodes and the timing of the sync signal detection to start the optical scanning of the imaging information of the laser diodes.

In the above-described embodiment, the semiconductor laser array 22 including the laser diodes 22-1 through 22-4 is used as the light source unit of the optical scanning device. Alternatively, the light source unit of the optical scanning device may be configured by a combination of a plurality of single-beam semiconductor lasers.

Next, a description will be provided of an example of the optical system of the optical scanning device of the present invention.

Figure 4:
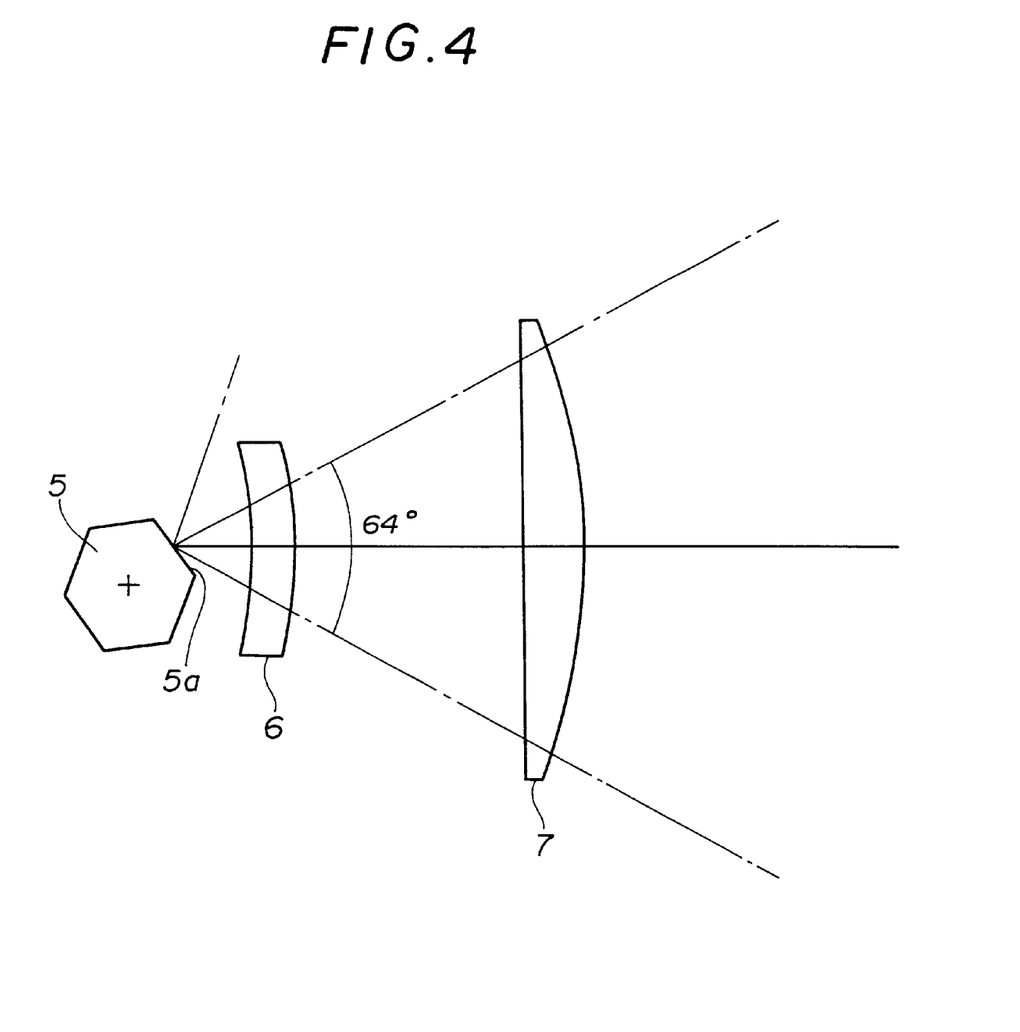
FIG. 4 is a diagram for explaining an optical path of laser beams in the optical system between the rotary polygonal mirror and the scanned surface.

FIG. 4 shows an optical path of the laser beams in the optical system between the rotary polygonal mirror 5 and the scanned surface 9a of the photosensitive belt 9.

The following TABLE provides particular data of the optical system of the optical scanning device 100 that is provided in the optical path of the laser beams between the rotary polygonal mirror 5 and the photosensitive belt surface 9a. Only the reflector mirror 8 is omitted for the sake of convenience.

TABLE

| Surface No. | Rm (mm) | Rs (0) (mm) | X (mm) | N | Remarks |
|---|---|---|---|---|---|
| polygon mirror | ∞ | ∞ | 24. | | reflection surface 5a |
| 1 | −109.4 | −109.4 | 12.4 | 1.82485 | f θ lens 6 |
| 2 | −102.1 | ∞ | 70.6 | | f θ lens 6 |

TABLE-continued

| Surface No. | Rm (mm) | Rs (0) (mm) | X (mm) | N | Remarks |
|---|---|---|---|---|---|
| 3 | ∞ | −125.5 | 19. | 1.60909 | focusing lens 7 |
| 4 | −206. | −36.6 | 257.6 | | focusing lens 7 |
| 5 | — | — | — | | scanned surface 9a |

(the wavelength of laser beam used is 780 nm)

In the optical system of the present embodiment, the laser beams, which are incident to the rotary polygonal mirror 5, are convergent in the sub-scanning direction in the vicinity of the reflection surface 5a. The laser beams incident to the rotary polygonal mirror 5 are substantially parallel in the main scanning direction. As shown in FIG. 4, the optical system of the present embodiment has a total field angle of 64°.

Figure 5A:
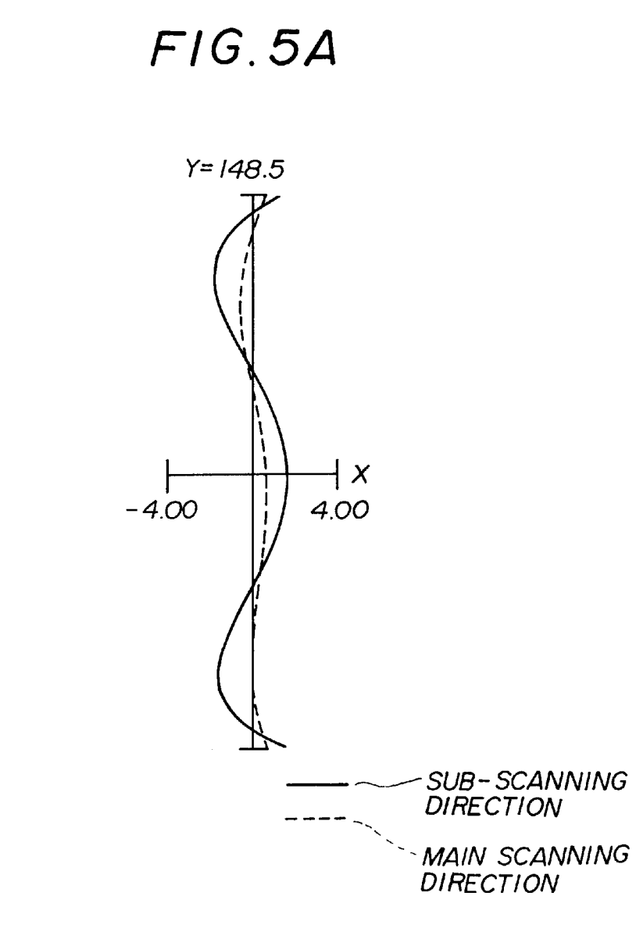
FIG. 5A and FIG. 5B are diagrams for explaining aberrations, a linearity and an f θ characteristic of the optical system of the present embodiment.
Figure 5B:
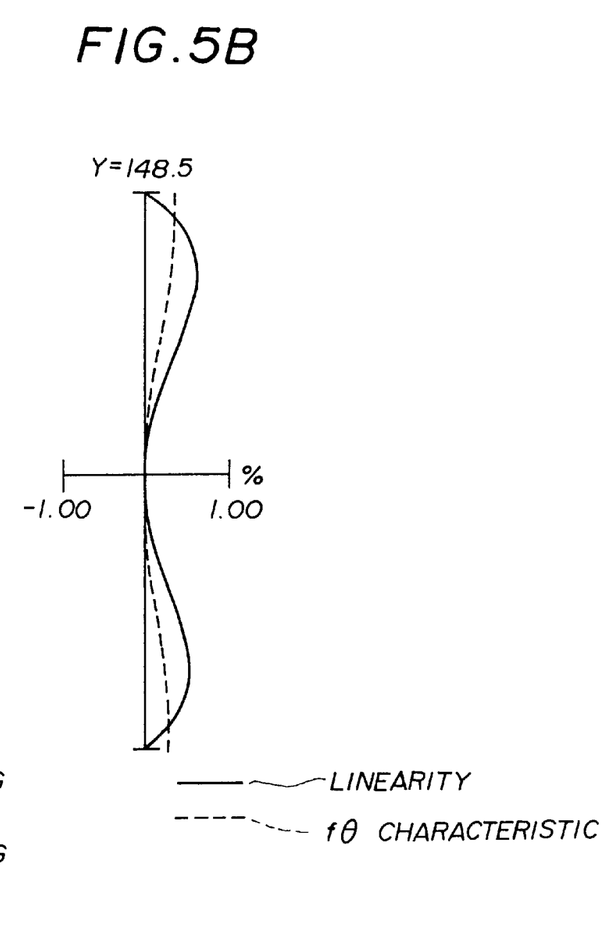

FIG. 5A and FIG. 5B show the aberrations, the linearity and the f θ characteristic of the optical system of the present embodiment. As shown in FIG. 5A and FIG. 5B, the optical system of the present embodiment provides suitably corrected aberrations. In the optical system of the present embodiment, the rotary polygonal mirror 5 having six reflection surfaces is considered.

Suppose that the rotary polygonal mirror 5 having eight reflection surfaces (n=8) is provided in the optical system of the present embodiment. The ratio of the imaging period "A" to the scanning period "T" is A/T=0.71. The above formula (4) yields $$R \cdot n \cdot m \cdot t < (1-A/T) \cdot 60 = 17.3$$

Therefore, the following formula has to be met.

$$R \cdot m \cdot t < (1-A/T) \cdot 60/n = 2.17 \tag{5A}$$

Suppose that the rotary polygonal mirror 5 having six reflection surfaces (n=6) is provided in the optical system of the present embodiment. The ratio of the imaging period "A" to the scanning period "T" is A/T=0.53. The above formula (4) yields $$R \cdot n \cdot m \cdot t < (1-A/T) \cdot 60 = 28$$

Therefore, the following formula has to be met.

$$R \cdot m \cdot t < (1-A/T) \cdot 60/n = 4.67 \tag{5B}$$

Suppose that the rotary polygonal mirror 5 having four reflection surfaces (n=4) is provided in the optical system of the present embodiment. The ratio of the imaging period "A" to the scanning period "T" is A/T=0.356. The above formula (4) yields $$R \cdot n \cdot m \cdot t < (1-A/T) \cdot 60 = 38.7$$

Therefore, the following formula has to be met.

$$R \cdot m \cdot t < (1-A/T) \cdot 60/n = 9.67 \tag{5C}$$

Suppose that the rotary polygonal mirror 5 having two reflection surfaces (n=2) is provided in the optical system of the present embodiment. The ratio of the imaging period "A" to the scanning period "T" is A/T=0.178. The above formula (4) yields $$R \cdot n \cdot m \cdot t < (1-A/T) \cdot 60 = 49.3$$

Therefore, the following formula has to be met.

$$R \cdot m \cdot t < (1-A/T) \cdot 60/n = 24.7 \tag{5D}$$

In the optical scanning device 100 in which one of the above examples of the optical system is provided, when the optical scanning device 100 is configured such that a corresponding one of the formulas (5A) through (5D) is met, it is possible for the optical scanning device 100 to prevent the interference between the timing of the light-amount control of the laser diodes and the timing of the sync signal detection to start the optical scanning of the imaging information by the laser diodes.

By taking into consideration the above formulas (5A) through (5D), the relationship between the number "n" of reflection surfaces of the rotary polygonal mirror 5 and the "R·m·t" parameter can be represented by the following formula.

$$R \cdot m \cdot t < 0.036 \cdot n^4 - 0.89 \cdot n^3 + 8.35 \cdot n^2 - 37.1 \cdot n + 72 \tag{6}$$

Figure 6:
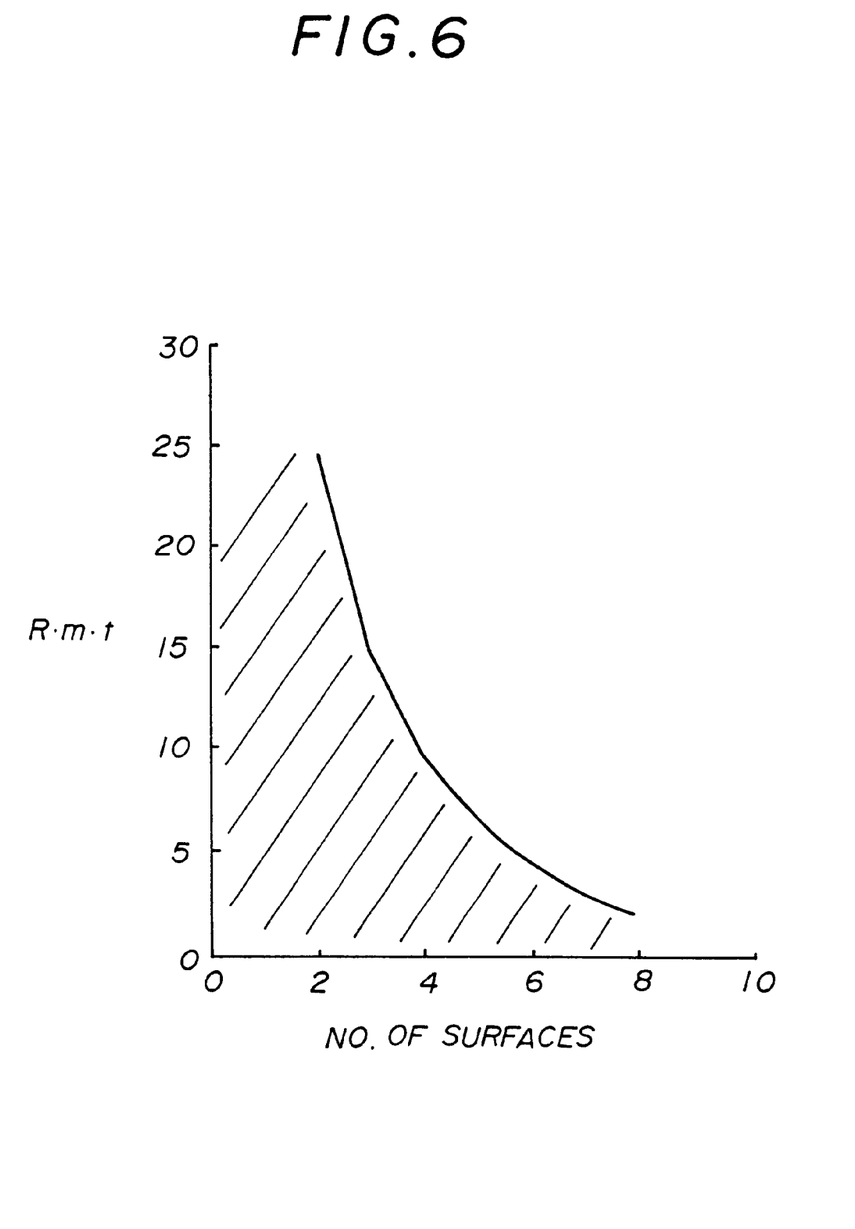
FIG. 6 is a diagram for explaining a relationship between the number of the reflection surfaces of the rotary polygonal mirror and the R·m·t parameter.

FIG. 6 shows such a relationship between the number of reflection surfaces of the rotary polygonal mirror 5 and the "R·m·t" parameter in the present embodiment.

Accordingly, when the optical scanning device 100 is configured such that the above formula (6) is met, it is possible for the optical scanning device 100 to safely prevent, with a simple, inexpensive configuration, the interference between the timing of the light-amount control of the laser diodes and the timing of the sync signal detection to start the optical scanning of the imaging information of the laser diodes.

The present invention is not limited to the above-described embodiment, and variations and modifications may be made without departing from the scope of the present invention.

Further, the present invention is based on Japanese priority application No.2000-013351, filed on Jan. 21, 2000, the entire contents of which are hereby incorporated by reference.

What is claimed is:

1. An optical scanning device comprising:

a plurality of light sources emitting a plurality of light beams;

an optical system having a rotary polygonal mirror deflecting the light beams from the light sources, the optical system focusing the deflected light beams onto a scanned surface to form light spots thereon, the scanned surface being optically scanned with the light spots by a rotation of the rotary polygonal mirror;

a light-amount monitoring unit monitoring respective amounts of the light beams emitted by the light sources; and a control unit controlling the respective amounts of the light beams emitted by the light sources, based on detection signals output from the light-amount monitoring unit, wherein the optical scanning device is configured to satisfy the formula: $A < T - m \cdot t$ where A is an imaging period from a start of the optical scanning of imaging information to an end of the optical scanning, m is the number of the light sources, t is a time needed to complete the control of the light amount of one of the light sources after monitoring of the amount of the light beam emitted by that light source, T is a scanning period indicated by the equation $T=60/(R \cdot n)$, R is the number of revolutions per minute of the rotary polygonal mirror, and n is the number of reflection surfaces of the rotary polygonal mirror.

2. An optical scanning device comprising:

a plurality of light sources emitting a plurality of light beams;

an optical system having a rotary polygonal mirror deflecting the light beams from the light sources, the optical system focusing the deflected light beams onto a scanned surface to form light spots thereon, the scanned surface being optically scanned with the light spots by a rotation of the rotary polygonal mirror;

a light-amount monitoring unit monitoring respective amounts of the light beams emitted by the light sources; and a control unit controlling the respective amounts of the light beams emitted by the light sources, based on detection signals output from the light-amount monitoring unit, wherein the optical scanning device is configured to satisfy the formula:

$$R \cdot m \cdot t < 0.036 \cdot n \cdot 4 - 0.89 \cdot n \cdot 3 + 8.35 \cdot n \cdot 2 - 37.1 \cdot n + 72$$

where m is the number of the light sources, t is a time needed to complete the control of the light amount of one of the light sources after monitoring of the amount of the light beam emitted by that light source, R is the number of revolutions per minute of the rotary polygonal mirror, and n is the number of reflection surfaces of the rotary polygonal mirror.

3. The optical scanning device according to claim 1, wherein the plurality of light sources and the light-amount monitoring unit are configured to form a light source unit, the light source unit including a substrate, a semiconductor laser array and a photodiode, the laser array and the photodiode being provided on the substrate, the laser array having a plurality of laser diodes arranged in parallel, and the photodiode monitoring respective amounts of laser beams emitted by the laser diodes.

4. The optical scanning device according to claim 1, wherein the control unit controls the respective amounts of the light beams emitted by the light sources such that, when one of the light sources is turned on to emit the light beam, the other light sources are set at one of an off-state level and a non-imaging level lower than an imaging level.

5. The optical scanning device according to claim 1, wherein the control unit performs the light-amount control of each of the light sources during a non-imaging period within an entire scanning period.

6. The optical scanning device according to claim 1, wherein the control unit performs the light-amount control of each of the light sources by selectively turning on one of the light sources.

7. The optical scanning device according to claim 2, wherein the plurality of light sources and the light-amount monitoring unit are configured to form a light source unit, the light source unit including a substrate, a semiconductor laser array and a photodiode, the laser array and the photodiode being provided on the substrate, the laser array having a plurality of laser diodes arranged in parallel, and the photodiode monitoring respective amounts of laser beams emitted by the laser diodes.

8. The optical scanning device according to claim 2, wherein wherein the control unit controls the respective amounts of the light beams emitted by the light sources such that, when one of the light sources is turned on to emit the light beam, the other light sources are set at one of an off-state level and a non-imaging level lower than an imaging level.

9. The optical scanning device according to claim 2, wherein the control unit performs the light-amount control of each of the light sources during a non-imaging period within an entire scanning period.

10. The optical scanning device according to claim 2, wherein the control unit performs the light-amount control of each of the light sources by selectively turning on one of the light sources.

11. An optical scanning device comprising:

light source means for emitting a plurality of light beams;

optical system means for deflecting the light beams from the light source means and for focusing the deflected light beams onto a scanned surface to form light spots thereon, the optical system means having a rotary polygonal mirror, the scanned surface being optically scanned with the light spots by a rotation of the rotary polygonal mirror;

light-amount monitoring means for monitoring respective amounts of the light beams emitted by the light source means; and control means for controlling the respective amounts of the light beams emitted by the light source means, based on detection signals output from the light-amount monitoring means, wherein the optical scanning device is configured to satisfy the formula: $A<T-m \cdot t$ where A is an imaging period from a start of the optical scanning of imaging information to an end of the optical scanning, m is the number of the light sources, t is a time needed to complete the control of the light amount of one of the light sources after monitoring of the amount of the light beam emitted by that light source, T is a scanning period indicated by the equation $T=60/(R \cdot n)$, R is the number of revolutions per minute of the rotary polygonal mirror, and n is the number of reflection surfaces of the rotary polygonal mirror.

12. An image forming apparatus in which an optical scanning device is provided, the optical scanning device comprising:

a plurality of light sources emitting a plurality of light beams;

an optical system having a rotary polygonal mirror deflecting the light beams from the light sources, the optical system focusing the deflected light beams onto a scanned surface to form light spots thereon, the scanned surface being optically scanned with the light spots by a rotation of the rotary polygonal mirror;

a light-amount monitoring unit monitoring respective amounts of the light beams emitted by the light sources; and a control unit controlling the respective amounts of the light beams emitted by the light sources, based on detection signals output from the light-amount monitoring unit, wherein the optical scanning device is configured to satisfy the formula: $A<T-m \cdot t$ where A is an imaging period from a start of the optical scanning of imaging information to an end of the optical scanning, m is the number of the light sources, t is a time needed to complete the control of the light amount of one of the light sources after monitoring of the amount of the light beam emitted by that light source, T is a scanning period indicated by the equation $T=60/(R \cdot n)$, R is the number of revolutions per minute of the rotary polygonal mirror, and n is the number of reflection surfaces of the rotary polygonal mirror.

13. An optical scanning method for use in an image forming apparatus, comprising the steps of:

providing a plurality of light sources emitting a plurality of light beams;

providing an optical system having a rotary polygonal mirror deflecting the light beams from the light sources, the optical system focusing the deflected light beams onto a scanned surface to form light spots thereon, the scanned surface being optically scanned with the light spots by a rotation of the rotary polygonal mirror;

monitoring respective amounts of the light beams emitted by the light sources; and controlling the respective amounts of the light beams emitted by the light sources, based on results of the light-amount monitoring;

wherein the optical scanning method is configured to satisfy the formula: $A<T-m \cdot t$ where A is an imaging period from a start of the optical scanning of imaging information to an end of the optical scanning, m is the number of the light sources, t is a time needed to complete the control of the light amount of one of the light sources after monitoring of the amount of the light beam emitted by that light source, T is a scanning period indicated by the equation $T=60/(R \cdot n)$, R is the number of revolutions per minute of the rotary polygonal mirror, and n is the number of reflection surfaces of the rotary polygonal mirror.

* * * * *